US012737000B2

(12) United States Patent
Bateni

(10) Patent No.: US 12,737,000 B2
(45) Date of Patent: Sep. 15, 2026

(54) DEEP LEARNING-BASED HOLDOVER COMPENSATION, AND RELATED SYSTEMS, METHODS AND DEVICES

(71) Applicant: Microchip Technology Incorporated, Chandler, AZ (US)

(72) Inventor: Ehsan Bateni, Richmond Hill (CA)

(73) Assignee: Microchip Technology Incorporated, Chandler, AZ (US)

( * ) Notice: Subject to any disclaimer, the term of this patent is extended or adjusted under 35 U.S.C. 154(b) by 222 days.

(21) Appl. No.: 17/446,813

(22) Filed: Sep. 2, 2021

(65) Prior Publication Data

US 2022/0261032 A1 Aug. 18, 2022

Related U.S. Application Data

(60) Provisional application No. 63/149,111, filed on Feb. 12, 2021.

(51) Int. Cl.
*G06F 1/12* (2006.01)
*G06N 20/00* (2019.01)

(52) U.S. Cl.
CPC ............... *G06F 1/12* (2013.01); *G06N 20/00* (2019.01)

(58) Field of Classification Search
None
See application file for complete search history.

(56) References Cited

U.S. PATENT DOCUMENTS 7,920,919 B1 * 4/2011 Nabutovsky ......... A61B 5/7207 607/19
11,063,738 B1 * 7/2021 Wang .................... H04L 7/0008
2009/0167443 A1 7/2009 Liu et al.
2009/0278616 A1 * 11/2009 Nicholls ................ H03L 7/146 331/44
2012/0294318 A1 * 11/2012 Fang ..................... H04J 3/0664 370/503
2014/0201561 A1 * 7/2014 Restle ....................... G06F 1/10 713/503
2018/0260726 A1 * 9/2018 Takada .................... G06F 17/18
2019/0238092 A1 8/2019 Sudo et al.
(Continued)

FOREIGN PATENT DOCUMENTS

CN 103684732 A 3/2014
CN 106026919 A 10/2016
(Continued)

OTHER PUBLICATIONS

International Search Report from International Application No. PCT/US2021/071356, mailed Dec. 13, 2021, 5 pages.
(Continued)

*Primary Examiner* — Paul Yen
(74) *Attorney, Agent, or Firm* — TraskBritt

(57) ABSTRACT

In one aspect, a method of adjusting a first oscillating signal, includes generating a relationship prediction responsive to a deep learning model configured to predict a relationship between a fundamental quantity of a first oscillating signal and a fundamental quantity of a second oscillating signal, and applying an adjustment to the first oscillating signal responsive to the relationship prediction to produce an adjusted oscillating signal, wherein the adjusted oscillating signal replaces the second oscillating signal.

29 Claims, 17 Drawing Sheets

(56) References Cited

U.S. PATENT DOCUMENTS

2020/0052704 A1 2/2020 Raghavan
2020/0162181 A1* 5/2020 Tang .................... H04J 3/0664
2020/0327156 A1* 10/2020 Mestres ................ G06F 16/432
2020/0410373 A1* 12/2020 Bin Awang Pon .......................... G06F 16/2264

FOREIGN PATENT DOCUMENTS

JP 2011-097513 A 5/2011
WO 2013/023068 A1 2/2013

OTHER PUBLICATIONS

International Written Opinion from International Application No. PCT/US2021/071356, mailed Dec. 13, 2021, 8 pages.
First Office Action and Search Report of Chinese Patent Application No. 202180093611.3, issued Jun. 1, 2026, 25 pages with English translation.

* cited by examiner

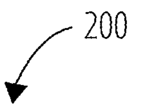

GENERATE A RELATIONSHIP PREDICTION RESPONSIVE TO A DEEP LEARNING MODEL CONFIGURED TO PREDICT A RELATIONSHIP BETWEEN A FUNDAMENTAL QUANTITY OF A FIRST OSCILLATING SIGNAL AND A FUNDAMENTAL QUANTITY OF A SECOND OSCILLATING SIGNAL 202

APPLY AN ADJUSTMENT TO THE FIRST OSCILLATING SIGNAL RESPONSIVE TO THE RELATIONSHIP PREDICTION TO PRODUCE AN ADJUSTED OSCILLATING SIGNAL, WHEREIN THE ADJUSTED OSCILLATING SIGNAL REPLACES THE SECOND OSCILLATING SIGNAL 204

*FIG. 2*

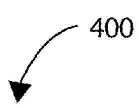

SENSE A SOURCE OF A TEMPERATURE EXHIBITED AT OR NEAR AN OSCILLATOR 402

PROVIDE A SENSED TEMPERATURE ($TEMP1_{N-N_{INPUTS}-1}$, . . ., $TEMP1_N$) AS AN INPUT TO A DEEP LEARNING MODEL, THE SENSED TEMPERATURE CORRESPONDING TO THE EXHIBITED TEMPERATURE, THE DEEP LEARNING MODEL CONFIGURED TO PREDICT A RELATIONSHIP BETWEEN A FUNDAMENTAL QUANTITY OF A FIRST OSCILLATING SIGNAL AND A FUNDAMENTAL QUANTITY OF A SECOND OSCILLATING SIGNAL RESPONSIVE TO THE SENSED TEMPERATURE 404

OPTIONALLY PROVIDE A SECOND SOURCE OF TEMPERATURE AS AN INPUT ($TEMP2_{N-N_{INPUTS}-1}$, . . ., $TEMP2_N$) TO THE DEEP LEARNING MODEL 406

PROVIDE A PREVIOUS RELATIONSHIP PREDICTION ($F_{N-1}$) GENERATED BY THE DEEP LEARNING MODEL TO THE DEEP LEARNING MODEL 408

GENERATE, RESPONSIVE TO THE SENSED TEMPERATURE AND THE DEEP LEARNING MODEL, A RELATIONSHIP PREDICTION 410

APPLY AN ADJUSTMENT TO AN OSCILLATING SIGNAL ASSOCIATED WITH THE OSCILLATOR RESPONSIVE TO THE RELATIONSHIP PREDICTION 412

*FIG. 4*

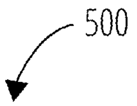

APPLYING THE ADJUSTMENT TO THE FIRST OSCILLATING SIGNAL DURING A PERIOD OF TIME DEFINED BETWEEN A FIRST SYNCHRONIZING EVENT AND A SECOND SYNCHRONIZING EVENT, WHEREIN THE SECOND OSCILLATING SIGNAL IS UNAVAILABLE DURING THE PERIOD OF TIME DEFINED BETWEEN THE FIRST SYNCHRONIZING EVENT AND THE SECOND SYNCHRONIZING EVENT. 502

PROVIDING A FREQUENCY OFFSET BETWEEN THE FIRST OSCILLATING SIGNAL AND THE SECOND OSCILLATING SIGNAL AS AN INPUT TO THE DEEP LEARNING MODEL 504

TRAINING THE DEEP LEARNING MODEL USING DATA COMPRISING A MEASUREMENT OF THE FUNDAMENTAL QUANTITY OF THE FIRST OSCILLATING SIGNAL AND A MEASUREMENT OF A TEMPERATURE EXHIBITED IN AN ENVIRONMENT OF A SOURCE OF THE FIRST OSCILLATING SIGNAL. 506

FIG. 5

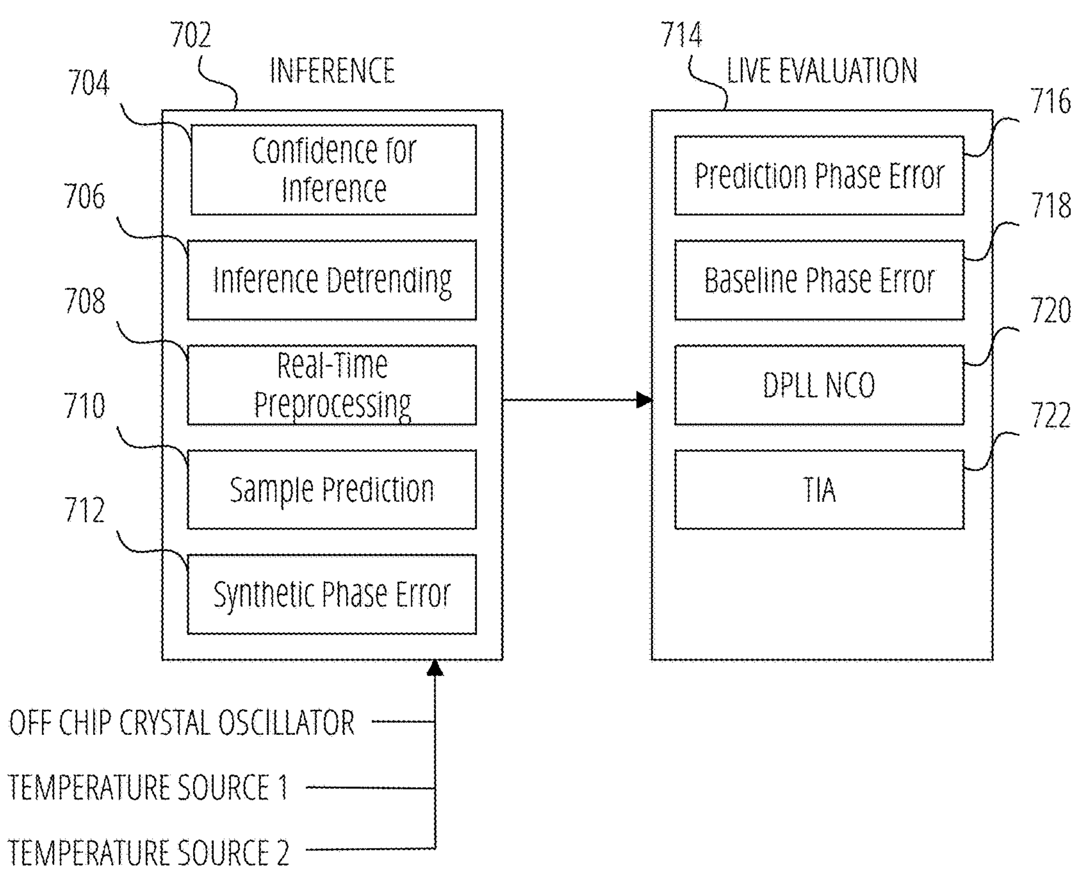
FIG. 7

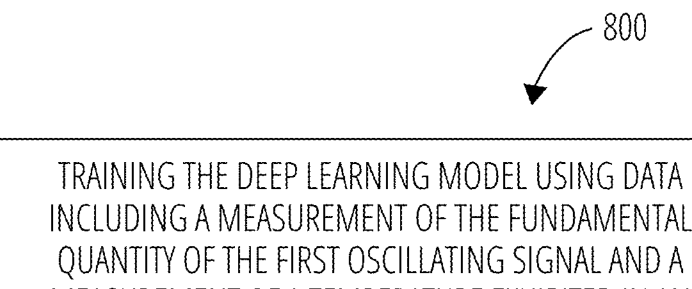

TRAINING THE DEEP LEARNING MODEL USING DATA INCLUDING A MEASUREMENT OF THE FUNDAMENTAL QUANTITY OF THE FIRST OSCILLATING SIGNAL AND A MEASUREMENT OF A TEMPERATURE EXHIBITED IN AN ENVIRONMENT OF A SOURCE OF THE FIRST OSCILLATING SIGNAL 802

PROVIDING A FREQUENCY OFFSET BETWEEN THE FIRST OSCILLATING SIGNAL AND THE SECOND OSCILLATING SIGNAL AS AN INPUT TO THE DEEP LEARNING MODEL. 804

SENSING ONE OR MORE SOURCES OF A TEMPERATURE EXHIBITED AT OR NEAR AN OSCILLATOR AND PROVIDING THE ONE OR MORE SOURCES OF THE TEMPERATURE AS INPUT TO THE DEEP LEARNING MODEL. 806

MODELING THE RELATIONSHIP BETWEEN THE FUNDAMENTAL QUANTITY OF THE FIRST OSCILLATING SIGNAL AND THE FUNDAMENTAL QUANTITY OF THE SECOND OSCILLATING SIGNAL 808

OBTAINING THE DEEP LEARNING MODEL RESPONSIVE TO TRAINING ONE OR MORE OF A MULTILAYER PERCEPTION (MLP) DEEP LEARNING MODEL, A RECURRENT NEURAL NETWORK (RNN) DEEP LEARNING MODEL, AND A LONG SHORT TERM MEMORY (LSTM) DEEP LEARNING MODEL 810

FIG. 8

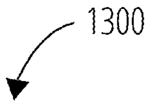

PERFORMING ADAPTIVE PIECEWISE DETRENDING ON A FREQUENCY OFFSET DATA OF THE FIRST OSCILLATING SIGNAL AND THE SECOND OSCILLATING SIGNAL TO ADDRESS CHANGES OF SLOPE IN THE FREQUENCY OFFSET DATA 1302

PERFORMING DIFFERENTIATION ON A FREQUENCY OFFSET BETWEEN THE FIRST OSCILLATING SIGNAL AND THE SECOND OSCILLATING SIGNAL DURING A PERIOD OF TIME DEFINED BETWEEN A FIRST SYNCHRONIZATION EVENT AND A SECOND, SUBSEQUENT SYNCHRONIZATION EVENT 1304

APPLYING AN ADJUSTMENT TO THE FIRST OSCILLATING SIGNAL DURING A PERIOD OF TIME DEFINED BETWEEN A FIRST SYNCHRONIZING EVENT AND A SECOND SYNCHRONIZING EVENT, WHEREIN THE SECOND OSCILLATING SIGNAL IS UNAVAILABLE DURING THE PERIOD OF TIME DEFINED BETWEEN THE FIRST SYNCHRONIZING EVENT AND THE SECOND SYNCHRONIZING EVENT 1306

FIG. 13

DEEP LEARNING-BASED HOLDOVER COMPENSATION, AND RELATED SYSTEMS, METHODS AND DEVICES

CROSS-REFERENCE TO RELATED APPLICATION

This application claims the benefit under 35 U.S.C. § 119(e) of U.S. Provisional Patent Application Ser. No. 63/149,111, filed Feb. 12, 2021, the disclosure of which is hereby incorporated herein in its entirety by this reference.

FIELD

One or more examples disclosed herein relate, generally, to signal coordination, and more specifically, one or more examples relate to synchronization of oscillating signals such as during a holdover period when a reference signal is not available.

BACKGROUND

Clocks are used in networked computer systems. It may be advantageous to synchronize clocks across a network. The period of time between synchronizations may be known as holdover. During holdover, clocks in the network may diverge from each other. In some cases, this divergence may produce undesirable outcomes.

BRIEF DESCRIPTION OF THE DRAWINGS

To easily identify the discussion of any particular element or act, the most significant digit or digits in a reference number refer to the figure number in which that element is first introduced.

FIG. 2 is a flow diagram depicting a generalized process for adjusting a first oscillating signal, in accordance with one or more examples.

FIG. 4 is a flow diagram depicting a process for adjusting an oscillating signal, in accordance with one or more examples.

FIG. 5 is a flow diagram of a process of training and using a deep learning model in accordance with one or more examples.

FIG. 7 is a functional block diagram depicting a deep learning model including inference and live evaluation of the deep learning model in an example consistent with one or more examples FIG. 8 is a flow diagram depicting a process for training a deep learning model, in accordance with one or more examples.

FIG. 13 is a flow diagram depicting a process according to one or more examples.

DETAILED DESCRIPTION

Figure 1:
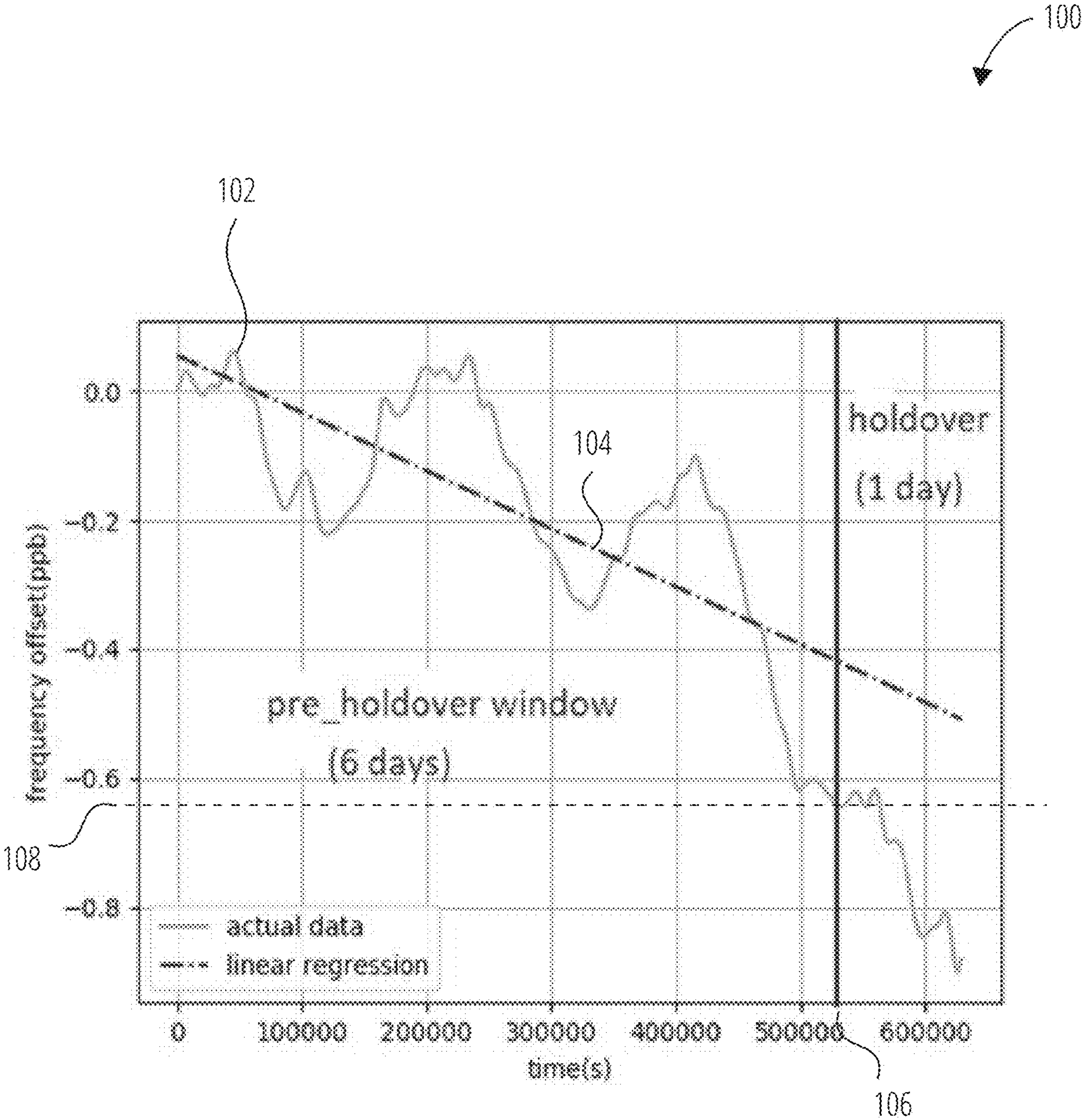
FIG. 1 is a schematic depicting a graph that includes a plot of frequency offset in parts per billion (ppb) versus time in seconds for an example system.

In the following detailed description, reference is made to the accompanying drawings, which form a part hereof, and in which are shown by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure. The illustrations presented herein are not meant to be actual views of any particular method, system device, or structure but are merely idealized representations that are employed to describe the examples of the present disclosure. The drawings presented herein are not necessarily drawn to scale. Similar structures or components in the various drawings may retain the same or similar numbering for convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in drawings, the drawings are not necessarily to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combinations thereof. Some drawings may illustrate signals as a single signal for clarity of presentation and description. It will be understood by a person or ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer may be configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communications media including any medium that facilitates transfer of a computer program from one place to another.

Any reference to an element herein used a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "holdover" refers to a period of time between synchronization events of two clocks. As holdover increases, the difference between the two clocks may increase in an uncontrolled fashion. One of the two clocks may be a network-transferred clock that is unavailable or unusable for synchronization during holdover.

As used herein, the term "deep learning" refers to computer algorithms which improve their predictions automatically through experience. Non-limiting examples of deep learning include Multilayer Perceptron (MLP), Recurring Neural Networks (RNN), and Long Short Term Memory (LSTM).

As used herein, the term "hyperparameter" refers to a parameter whose value is used to control the deep learning model.

As used herein, the term "piecewise detrending" refers to a process of breaking historical data into pieces and extracting trends based on the pieces individually. Piecewise detrending may be useful when the trend of the historical data is changing over time.

As used herein, the term "fundamental properties" refers to wavelength, phase, frequency, amplitude, and similar properties of a waveform.

As used herein the term "oscillating" indicates a parameter which has two states and regularly moves between the two states.

FIG. 1 (PRIOR ART) is a schematic diagram depicting a graph 100 that includes a plot 102 of frequency offset (in parts per billion (ppb)) versus time (in seconds) for an example system known to the inventor of this disclosure. A line 104 depicted in plot 102 represents a linear regression of the frequency offset from 0 seconds to about 525,000 seconds (time 106). At time 106, the example system starts a holdover for a 24-hour time duration. Plot 102 continues to shift away from the last frequency offset value (last value 108) before time 106. Further, the frequency offset values after time 106 do not trend with the linear regression represented by line 104 before time 106. Accordingly, it is now appreciated by the inventor of this disclosure that methods for using last value 108 before the holdover period start at time 106 and using a trend represented by line 104 before the holdover period does not accurately predict the plot 102 after the holdover period starts at time 106. Accordingly, the inventor of this disclosure appreciates a need for methods that reliably predict frequency offset values, and systems and devices that implement and use the same.

One or more examples relate, generally, to a method of adjusting a first oscillating signal, including: generating a relationship prediction using a deep learning model configured to predict a relationship between a first oscillating signal and a second oscillating signal; and applying an adjustment to the first oscillating signal responsive to the relationship prediction to produce an adjusted oscillating signal, wherein the adjusted oscillating signal replaces the second oscillating signal.

FIG. 2 is a flow diagram depicting a generalized process 200 for adjusting a first oscillating signal, in accordance with one or more examples.

At operation 202, process 200 generates a relationship prediction in response to a deep learning model. The deep learning model is configured to predict a relationship between a fundamental quantity of a first oscillating signal and a fundamental quantity of a second oscillating signal.

At operation 204, process 200 applies an adjustment to the first oscillating signal responsive to the relationship prediction. The adjustment may be a frequency offset. In some examples, the adjustment may be performed using a numerically controlled oscillator (NCO) of a digital phase locked loop (DPLL). The adjustment corrects for differences between the first oscillating signal and the second oscillating signal. This allows the adjusted first oscillating signal to simulate the second oscillating signal. The second oscillating signal may not be available, and the first oscillating signal may be in holdover due to the second oscillating signal being unavailable. In one or more examples, a holdover may be for 4 hours. In one or more examples, a holdover may be for 24 hours. In one or more examples, a holdover may be between 1 hour and 72 hours.

In one or more examples, process 200 may include training the deep learning model using data comprising a measurement of a fundamental quantity of the first oscillating signal and a measurement of a temperature exhibited in an environment of a source of the first oscillating signal. The temperature exhibited in the environment of the source of the first oscillating signal may be first temperature source 310 or second temperature source 312 depicted by FIG. 3.

Figure 3:
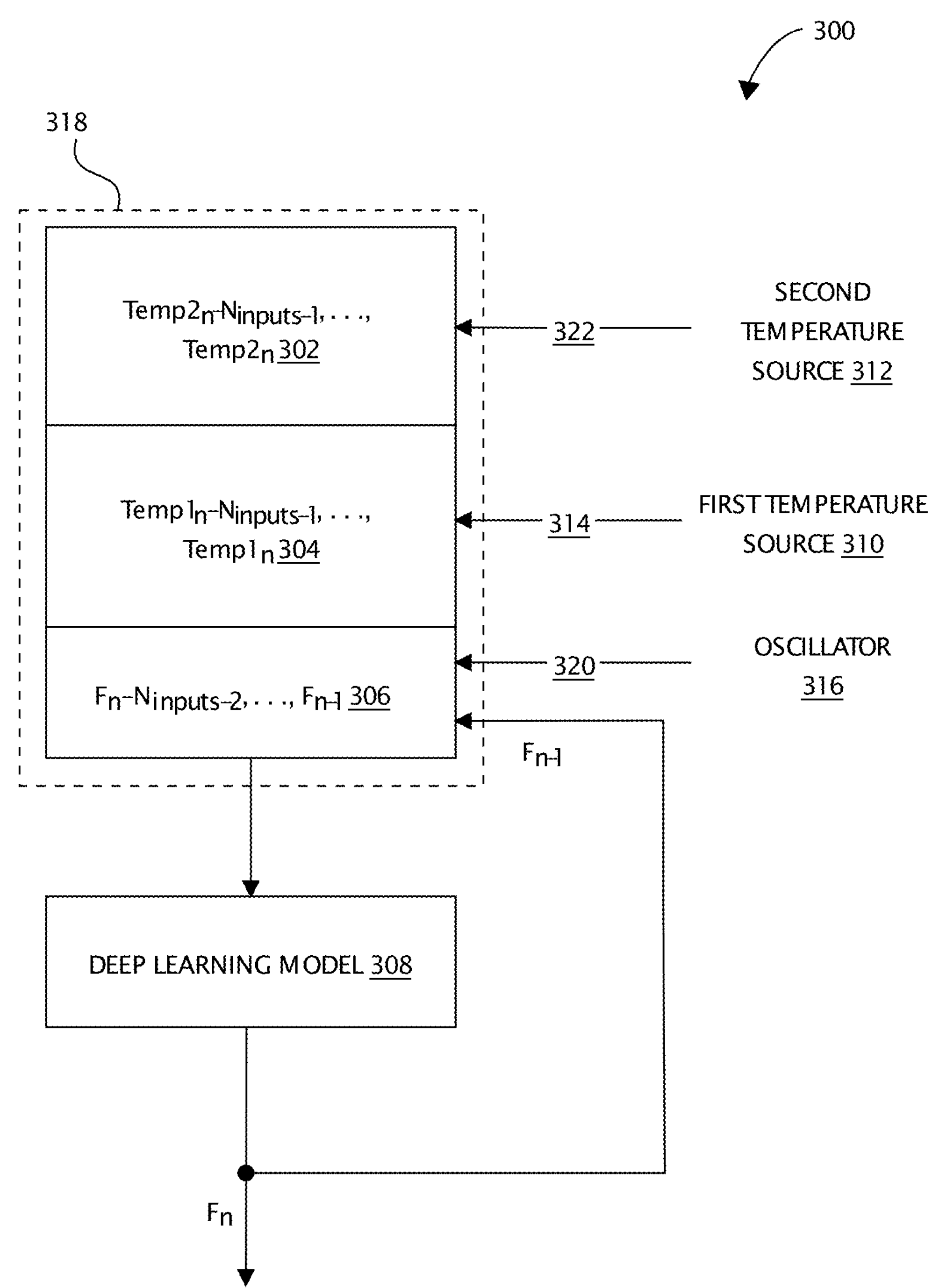
FIG. 3 is a functional block diagram depicting a frequency offset predictor, in accordance with one or more examples.

FIG. 3 is a functional block diagram depicting a frequency offset predictor 300, in accordance with one or more examples. Frequency offset predictor 300 is configured, generally, to predict a relationship (e.g., offset, without limitation) between a fundamental quantity of a first oscillating signal (e.g., frequency of the first oscillating signal) and a fundamental quantity of a second oscillating signal (e.g., frequency of the second oscillating signal).

Model inputs 318 are provided at frequency offset predictor 300 to train a deep learning model 308. Model inputs 318 include block 304, block 306, and optional block 302. Block 302, block 304, and block 306 are each associated with a different input source or type of input (e.g., current or historical measurements of temperatures, frequency, phase, or amplitude, without limitation). The input values of block 302 may be second temperature source 312 or measurements thereof. The input values of block 306 may be provided by an oscillator 316. The input values of block 304 may be provided by the first temperature source 310, or measurements thereof. The input values to block 304 and block 306 are used to train the deep learning model 308. The inputs of block 306 and block 304 may be combined to generate function values of block 306. The function values of block 306 are the inputs to the deep learning model 308. The function values include temperature data and time data. The function values of block 306, in a closed loop operation of frequency offset predictor 300, are provided to deep learning model 308 to generate a frequency offset (FO) prediction, $F_n$. The FO prediction ($F_n$) is also fed back into the deep learning model 308 as an additional input, e.g., as $F_{n-1}$. For example, the current frequency offset prediction may become the previous frequency offset prediction when a new prediction is generated.

Deep learning model 308 is configured, generally, to provide an estimate of the offset (e.g., difference) between a frequency of a first oscillating signal and a frequency of a second oscillating signal. In one or more examples, the deep learning model 308 combines the frequency offset prediction with the frequency of the first oscillating signal to provide an estimate of the frequency of the second oscillating signal. Optionally, a signal having a frequency of the combination of the frequency of the first offset signal and the frequency offset prediction may be produced. Deep learning model 308 may be any of a variety of deep learning models, including, without limitation, Multilayer Perceptron (MLP), Recurrent Neural Network (RNN), and Long Short Term Memory (LSTM). In one or more examples, deep learning models 308 may be trained in open-loop form, closed-loop form, and combinations thereof. In one or more examples, deep learning models 308 may be trained in open-loop form and then validated and operated in closed-loop form.

First temperature source 310 is a source of temperature data and more specifically, a first sensed temperature 314. The temperature data is relevant to the performance of oscillator 316 used to generate the first oscillating signal. The temperature represented by the temperature data may exhibit a relationship with the oscillator 316. For example, a fundamental property of the oscillator 316 may increase with an increase in temperature. In an example, a frequency of the oscillating signal generated by the oscillator 316 may shift with temperature change, e.g., the frequency of the oscillating signal generated by the oscillator 316 may increase with an increase in temperature of the oscillator 316. In one or more examples, the first temperature source 310 may be a temperature taken in a vicinity of oscillator 316 used to generate an oscillating signal. The first temperature source 310 may be a temperature sensor. First temperature source 310 may be a thermocouple. The temperature data, i.e., first sensed temperature 314, is provided to the deep learning model 308. In some examples, the first temperature source 310 may provide information which helps the deep learning model 308 predict a frequency offset between a first oscillating signal and a second oscillating signal 320.

Second temperature source 312 is a second source of temperature data and more specifically, a second sensed temperature 322. The second temperature source 312 is optional. The second temperature source 312 detects temperature near a source of the first oscillating signal. First temperature source 310 and second temperature source 312 may be a same kind of temperature data. For example, a voltage, a digital value, or a current, without limitation. Alternately, first temperature source 310 and second temperature source 312 may be different kinds of temperature data. The use of a first temperature source 310 and a second temperature source 312 may provide robustness to the deep learning model 308.

FIG. 4 is a flow diagram depicting a process 400 for adjusting an oscillating signal, in accordance with one or more examples.

At operation 402, process 400 senses a temperature exhibited at, or near, an oscillator, such as oscillator 316. The sensed temperature represents the thermal condition of the oscillator 316. The sensed temperature may be directly measured by any suitable temperature sensing device such as a thermocouple, thermometer, temperature sensor, or thermistor, without limitation. The sensed temperature may be indirectly measured, for example, with a multimeter measuring a resistance of a resistor.

At operation 404, process 400 provides a sensed temperature ($\mathbf{Temp1}_{n-Ninputs-1}, \ldots, \mathbf{Temp1}_n$) as an input to a deep learning model, the sensed temperature corresponding to the temperature exhibited at, or near, the oscillator 316 of operation 402. The deep learning model 308 is configured to predict a relationship between a fundamental quantity of a first oscillating signal and a fundamental quantity of a second oscillating signal responsive to the sensed temperature.

At operation 406, process 400 optionally provides a second temperature source as an input ($Temp\mathbf{2}_{n-Ninputs-1}$, . . . , $Temp\mathbf{2}_n$) to the deep learning model 308, the second temperature source 312 associated with the oscillator 316. The use of a second temperature source 312 may improve robustness of the deep learning model 308. However, the use of a second (or third, etc.) temperature source is optional.

At operation 408, process 400 provides a previous frequency offset prediction ($F_{n-1}$) generated by the deep learning model 308 to the deep learning model 308. In some examples, the previous relationship prediction is available. In other examples, the previous relationship prediction is unavailable, for example, when starting the system. In such cases, it may not be possible to provide the previous relationship prediction to the deep learning model 308. In other examples, it may be advantageous to not provide the previous relationship prediction. Accordingly, in some examples, the previous relationship prediction is optional.

At operation 410, process 400 generates, responsive to the sensed temperature and the deep learning model 308, a relationship prediction. In one or more examples, the relationship prediction is a frequency offset. In one or more examples, the relationship prediction is a frequency.

At operation 412, process 400 applies an adjustment to an oscillating signal associated with the oscillator 316 responsive to the relationship prediction. In an example, the adjustment is applied by adjusting a numerically controlled oscillator of a digital phase locked loop. The oscillator 316 may be a crystal oscillator. The oscillator 316 may be a piezoelectric oscillator. In one or more examples, the adjustment to the oscillating signal may include applying a frequency offset to the oscillating signal which adjusts the oscillating signal to track a second oscillating signal that is at least temporarily not present or otherwise available.

FIG. 5 is a flow diagram of a process 500 of training and using deep learning model 308 in accordance with one or more examples.

At operation 502, process 500 applies the adjustment to the first oscillating signal during a period of time defined between a first synchronizing event and a second synchronizing event, wherein the second oscillating signal is unavailable during the period of time defined between the first synchronizing event and the second synchronizing event. The period of time between the first synchronization event and the second synchronization event may be a holdover. During the holdover, the second oscillating signal is unavailable. Accordingly, an adjusted second oscillating signal may be generated from the first oscillating signal and the adjustment. The adjustment allows generation of the adjusted second oscillating signal from the first oscillating signal. In some examples, the adjustment is a frequency offset.

At operation 504, process 500 provides a frequency offset (e.g., a measurement of the frequency offset) between the first oscillating signal and the second oscillating signal as an input to a deep learning model (e.g., deep learning model 308, without limitation) configured to train to predict a frequency offset responsive to historical frequency offset data, historical temperature data, and historical frequency offset predictions (e.g., generated by frequency offset predictor 300, without limitation). Once trained, the frequency offset predictor 300 may be used to predict a frequency offset given a sensed temperature of a first temperature source 310 and a frequency of a first oscillating signal 320. The use of the first oscillating signal and the frequency offset allows prediction of the second oscillating signal during holdover when the second oscillating signal is unavailable.

At operation 506, process 500 trains the deep learning model using data comprising a measurement of the fundamental quantity of the first oscillating signal and a measurement of a temperature exhibited in an environment of a source of the first oscillating signal. In some examples, frequency is the fundamental quantity of the first oscillating signal used in training the deep learning model 308. In some examples, the fundamental quantity used is frequency offset between the first oscillating signal and the second oscillating signal. The measurement of the temperature is similarly used to train the deep learning model 308. The trained deep learning model 308 may produce a frequency offset prediction between the first oscillating signal and the second oscillating signal 320. As discussed above, this allows the frequency offset predictor 300 to simulate the second oscillating signal using the first oscillating signal and the frequency offset prediction. This is useful to provide a representation of the unavailable second oscillating signal during holdover using the first oscillating signal (which may be a local signal and therefore available during holdover) and the deep learning model 308.

Figure 6:
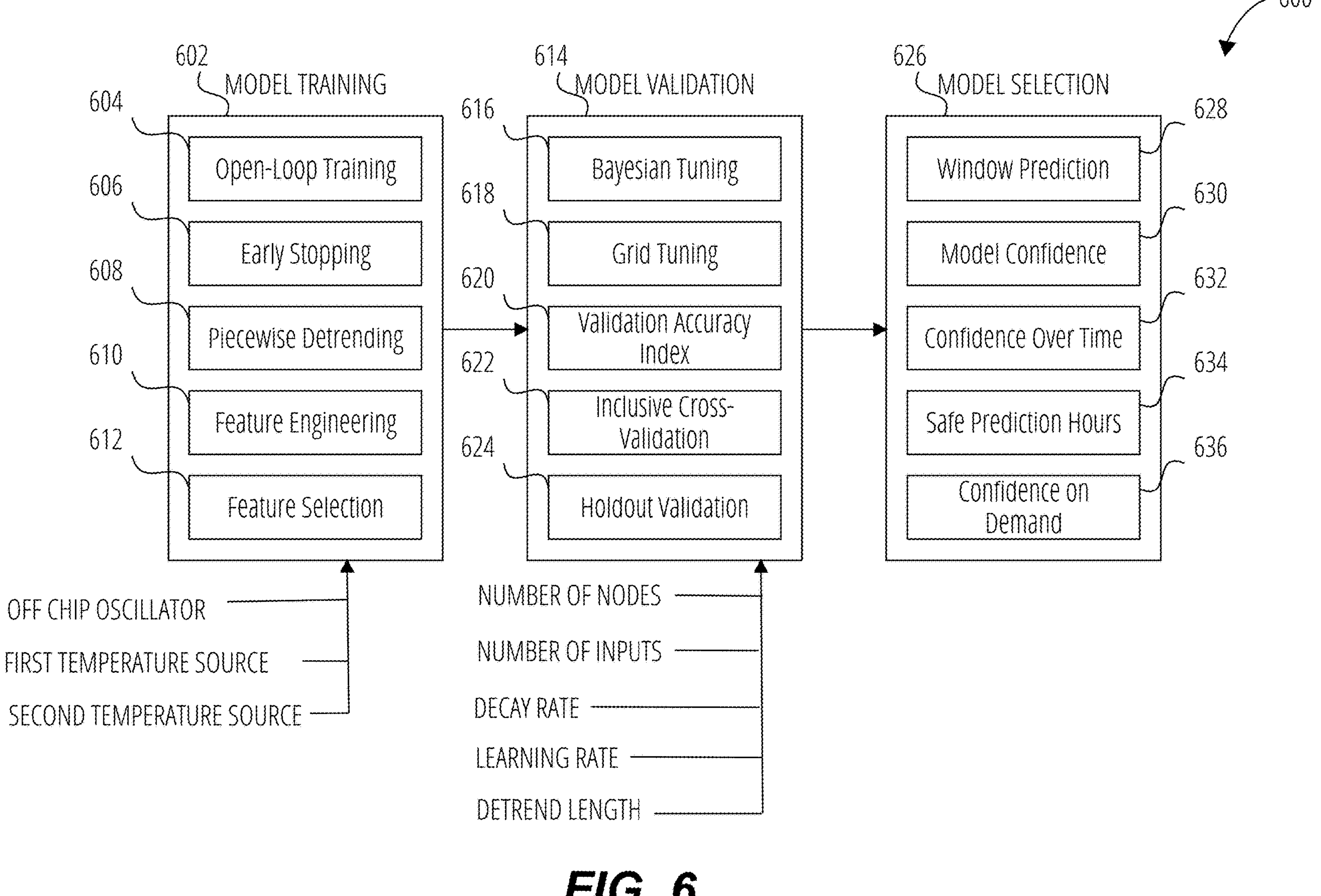
FIG. 6 is a functional block diagram depicting model preparation, model training, and model validation in accordance with one or more examples

FIG. 6 is a functional block diagram depicting a model preparation 600, model training 602, and model validation 614 in accordance with one or more examples. Model preparation 600 may include model training 602, model validation 614, and model selection 626. Model training 602 involves the processes to train the models. Model validation 614 involves the processes to validate the models. Model selection 626 involves selection of a model with a highest confidence.

Model training 602 may include open-loop training 604, early stopping 606, piecewise detrending 608, feature engineering 610, or feature selection 612. The models may be optimized as part of the model training 602 process. In some examples, multiple models are trained and validated. The model with a greatest confidence value may then be selected to determine the relationship between the first oscillating signal and second oscillating signal.

Open-loop training 604 may include training deep learning model 308 in an open loop configuration. This allows data from the first oscillating signal and second oscillating signal to be used to train the model. Open-loop training 604 thus incorporates feedback from the deep learning model 308 and uses the feedback to at least partially adjust the deep model learning model 308. Open-loop training 604 is advantageous in that the actual data is used to train the deep learning model 308.

Early stopping 606 may include stopping iterative solutions to avoid overfitting the data and reducing the ability of the system to apply the general case to subsequent data. Early stopping 606 may be useful when dealing with noise in data where overfitting to the noise does not increase the predictive power of the algorithm.

The deep learning model 308 is trained using historical frequency offset data and historical temperature data. The historical temperature data may be stored as temperature data provided to the deep learning model 308 as part of the frequency offset predictor 300. The historical temperature data may be stored as $Temp\mathbf{1}_n$ inputs in block 304 or $Temp\mathbf{2}_n$ inputs in optional block 302. The historical frequency offset data may be stored as $F_n$ values in block 306 of the frequency offset predictor 300.

Piecewise detrending 608 may include addressing aging slope changes in a detrend model. The input Frequency Offset (FO) data is split into equal length sections. Each of the equal length sections is detrended independently. The length of the sections (e.g., 3-days, 10-days) may be a tunable hyperparameter of the deep learning model 308 so the deep learning model 308 itself solves the trade-off between learning slight slope changes (longer detrend length) or having better detrended data (shorter detrend length). Piecewise detrending 608 allows for better modeling of the trends of the oscillator 316.

Feature engineering 610 may include selecting the sources of data and types of data to be used to train the system. The two main sources of data for the claimed system are oscillator frequency data and temperature source data. These are used to train the deep learning model 308 against the second oscillator frequency data. The second oscillator frequency data may be limited to data outside a window, for example, more than 24 hours old. This allows the system to model features as if in a holdover period of 24 hours, encouraging development of more complex models than last value model or linear trending. Clearly, other time periods than 24 hours may be used both for the selected features and for the model holdover period.

Feature selection 612 may include refining the model features so as to eliminate low information features and improve result comprehensibility. Feature selection 612 may, in some cases, reduce dimensionality of the resources used by the deep learning model 308. In one or more examples, feature selection 612 may increase learning accuracy of the deep learning model 308.

Model validation 614, may include Bayesian tuning 616, grid tuning 618, a validation accuracy index 620, an inclusive cross-validation 622, or a holdout validation 624. Model validation 614 may include hyperparameter optimization as well as parameter optimization.

Bayesian tuning 616 is typically more computationally intensive for a computer than grid tuning 618 (discussed below), but may produce results in fewer iterations than grid tuning 618. Bayesian tuning 616 uses the past results to make a prediction about which hyperparameters may be closer to a desired "optimum" value. This allows the system to spend time evaluating selected hyperparameter possibilities and not spend time on low probability hyperparameter values. In contrast, grid tuning 618 walks through a predicted hyperparameter space without using the accumulating results to adjust the grid or the grid pattern. Bayesian tuning 616 may be particularly useful in deep learning models 308 where the time to evaluate a set of hyperparameters is long relative to the calculation time to determine a set of hyperparameters.

Grid tuning 618 is a method of optimizing hyperparameters. It involves forming an n-space grid of hyperparameters and then evaluating the nodes of the grid. Grid tuning 618 may be less efficient than Bayesian tuning 616 on a per iteration basis.

In some examples, grid tuning 618 is used to generate an initial population of hyperparameter sets. These hyperparameter sets then provide the basis for Bayesian tuning 616. For example, grid tuning 618 may calculate an initial set of hyperparameter sets which are then used to perform Bayesian tuning 616 on additional, generated hyperparameter sets. This combination of grid tuning 618 and Bayesian tuning 616 provides the advantages of Bayesian tuning 616 while still being able to start from zero data like grid tuning 618. In some examples, the number of inputs, number of hidden nodes, learning rate, decay rate, and detrend length are optimized using Bayesian tuning 616.

Validation accuracy index 620 uses an index to compare the order of models having best validation error and best test error. The index allows different models (e.g., differential and derivative models) and different methods of evaluating the models to be compared on a common reference frame. This allows the selection of the highest confidence model despite having multiple types of models. In some examples, the use of confidence values for the common reference frame allows comparison of different models on a standard reference scale. Confidence values can be expressed in terms of meeting a given parameter. For example, the confidence values can be computed as a percentage of a time that a model prediction is within a given range of the actual value.

Inclusive cross-validation 622 is a type of cross-validation where only one training is done on the whole data. This approach does not do N-folds trainings on leftovers. The one training is done in open-loop mode and prediction is carried out on different folds in closed-loop mode and averaged over the set to determine validation error. Inclusive cross-validation may be advantageous when dealing with time series data.

Holdout validation 624 involves forming a modeling set and a test set from the data. The modeling set is used to construct the model which is then tested with the test set. Holdout validation only involves a single run through the validation and is vulnerable to anomalous results due to forming the modeling set and the test set. Holdout validation may be used to validate the various deep learning models 308.

Model selection 626 may include window prediction 628, model confidence 630, confidence over time 632, safe prediction hours 634, or confidence on demand 636. After differential and detrend models are trained and validated, a final model is selected between them by model selection 626 based on a specific confidence value obtained from multiple predictions on overlapping windows of test data and finally comparing final metric (phase error over prediction time) for each window prediction with an acceptable threshold. This confidence value can change over time, e.g., with new test data, and may be computed on demand, e.g., as confidence on demand 636. The test data is compared using phase error over prediction time for each window prediction 628 with a value above a threshold. The confidence value can change over time (e.g., as new data is available) and can be computed on demand.

The frequency offset may be converted to a phase error. The phase error may be determined based on the first oscillating signal and the second oscillating signal. In some examples, the frequency offset prediction is converted into a phase error prediction before conducting other analysis. The phase error prediction may be compared with a threshold phase error and the result reported. The phase error prediction may be converted to a metric of phase error over prediction time. This reports the phase error prediction as a function of time. In some examples, the phase error prediction over prediction time may report a percentage below a threshold or a confidence interval compared with a threshold. For example, the phase error prediction over prediction time may be reported in percentage time below a threshold. In some examples, the confidence level compared with the threshold is used so that different types of models can be compared.

Model confidence 630 is a measure representing the accuracy of various deep learning models 308 for predicting the relationship between fundamental quantities. Model confidence 630 may be assessed over a fixed period of time. Model confidence 630 may be assessed using a fixed set of hyperparameters. Model confidence 630 may depend on comparing the model value with the actual value over a window of time.

Confidence over time 632 defines the confidence of various deep learning models 308 over time. The various deep learning models 308 are assessed with how they model the time series generated by the first oscillating signal 320. Safe prediction hours 634 describes a number of hours that confidence over time 632 is above a threshold. The threshold may be set to provide a minimum confidence level. In some examples, the threshold is 80%, 90%, 95%, or another value.

Confidence on demand 636 refers to determining the confidence in the models in response to a request for a result. The model with the highest confidence can then be selected and used to calculate the results. This approach works well with holdover as the model that functions with highest confidence immediately prior to the holdover starting may be selected.

FIG. 7 is a functional block diagram depicting a deep learning model 700 including inference stage 702 and live evaluation stage 714 of the deep learning model 308 in an example consistent with one or more examples. The system comprises an inference stage 702 where the deep learning model 308 is developed and a live evaluation stage 714 where the deep learning model 308 is used. Inference stage 702 may include a confidence for inference 704, an inference detrending 706, a real-time preprocessing 708, a sample prediction 710, or a synthetic phase error 712. Live evaluation stage 714 may include a prediction phase error 716, a baseline phase error 718, a digital phase locked loop (DPLL) numerically controlled oscillator (NCO) 720, or a time interval analyzer (TIA) 722.

Confidence for inference 704 includes assessment of the confidence of the deep learning model 308 immediately prior to the start of the holdover.

Inference detrending 706 refers to calculating an independent trend for inference on data immediately prior to the start of inference. Such a trend calculation uses the most recent data prior to the holdover period.

Real-time preprocessing 708 is preprocessing of data for the deep learning model 308 in real-time. Real-time preprocessing 708 allows for faster evaluation.

Sample prediction 710 compares the sampled value of the deep learning models 208 to the first oscillating signal to determine the accuracy of the deep learning models 308. Sample prediction 710 may be compared on a simulated holdover of a fixed period of time, e.g., 24 hours.

The synthetic phase error 712 is a calculated phase error generated by the deep learning model 308. The synthetic phase error models the offset between the reference signal (e.g., the second oscillating signal) and a local signal (e.g., the first oscillating signal). The synthetic phase error may be combined with the local first oscillating signal to simulate the second signal during holdover when the second signal is not available or useable for some reason, e.g., during holdover. In some examples, the synthetic phase error 712 provides a predicted value for the phase error between the first oscillating signal and the second oscillating signal. The phase error may be used to calculate a frequency offset between the first oscillating signal and the second oscillating signal.

Prediction phase error 716 refers to a phase error prediction (e.g., a peak-to-peak phase error, without limitation) by the deep learning model 308 based on the model inputs 318. The prediction phase error 716 may be used to control the DPLL NCO 720. The prediction phase error 716 may be compared with the actual phase error to assess the quality of the predictions. This may be performed over a period of time for each of the deep learning models 308.

The TIA 722 is configured to verify the prediction phase error 716 and compare the prediction phase error 716 to a network reference, e.g., the second oscillating signal.

FIG. 8 is a flow diagram depicting a process 800 for training a deep learning model 308, in accordance with one or more examples. Operations 802 to 808 train the deep learning model 308.

At operation 802, process 800 trains the deep learning model 308 using data including a measurement of the fundamental quantity of the first oscillating signal and a measurement of a temperature exhibited in an environment of a source of the first oscillating signal. The deep learning model 308 is thus operationally responsive to the temperature in the environment of the source of the first oscillating signal. The deep learning model 308 learns to predict the difference between the first oscillating signal and the second oscillating signal based on the first temperature source 310.

At operation 804, process 800 provides a frequency offset between the first oscillating signal and the second oscillating signal 320 as an input to the deep learning model 308. The frequency offset may subsequently be used as a data source for the deep learning model 308.

At operation 806, process 800 senses one or more sources of a temperature exhibited at or near an oscillator and provides the one or more sources of the temperature as input to the deep learning model. The first temperature source 310 and optional second temperature source 312 may be provided to the deep learning model 308 as inputs. The behavior of oscillator 316 may be a function of temperature. The combination of historical temperature data with historical frequency offset data (e.g., time data) for the oscillator 316 allows effective prediction of the second oscillating signal by the deep learning model 308.

At operation 808, process 800 models the relationship between the fundamental quantity of the first oscillating signal and the fundamental quantity of the second oscillating signal. The deep learning model 308 may be a model of the relationship between the first and second oscillating signals. This relationship is a function of temperature.

At operation 810, process 800 obtains the deep learning model 308 responsive to training one or more of a multilayer perception (MLP) deep learning model, a recurrent neural network (RNN) deep learning model, and a long short term memory (LSTM) deep learning model. While specific examples of suitable deep learning models 308 are provided, other artificial intelligence models may also be used to perform the described modeling. As will be appreciated by a person of skill in the art, the use of a deep learning model 308 allows for effective compensation for a missing second oscillating signal during holdover based on a remaining first oscillating signal and temperature data. The ability for a system to model a missing second oscillating signal provides robustness during holdover when the second oscillating signal is not available.

Figure 9:
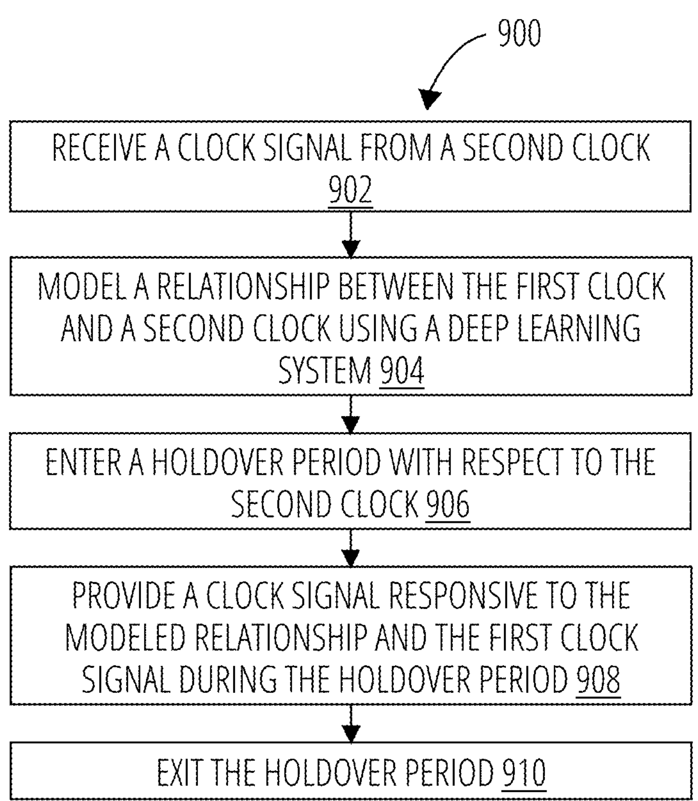
FIG. 9 is a flow diagram depicting a process in accordance with one or more examples.

FIG. 9 is a flow diagram depicting a process 900 in accordance with one or more examples.

In FIG. 9, at operation 902, process 900 receives a second clock signal from a second clock. The second clock signal may be received from off-chip. In some examples, the second clock signal is received over a network. The clock signal may be a master Precision Time Protocol (PTP) clock signal.

In operation 904, process 900 models a relationship between a first clock signal, received from a first clock, and the second clock signal using a deep learning model 308. The deep learning model 308 models the relationship between the first clock signal and the second clock signal. This relationship may be validated in open loop using the first clock signal.

In operation 906, process 900 enters a holdover period with respect to the second clock signal. During the holdover period, the deep learning model 308 operates in closed loop to predict an offset between the second clock signal and the first clock signal. This offset may be used to simulate the second clock signal while the second clock signal is unavailable. The holdover period may be 1 hour, 2 hours, 3 hours, 4 hours, 6 hours, 8 hours, 10 hours, 12 hours, 16 hours, or 24 hours. In some embodiments, the holdover period may be longer than 24 hours, for example, 48 or 72 hours. However, the disclosure is not so limited, and any holdover period may be modeled with the deep learning model 308 to simulate the unavailable clock signal. Longer holdover periods potentially allow for greater divergence between the actual second clock signal and the adjusted clock signal of the deep learning model 308.

In operation 908, process 900 provides an adjusted clock signal responsive to the modeled relationship and the first clock signal during the holdover period. This allows adjustment of the second clock signal based on the first clock signal and the deep learning model 308. The deep learning model 308 depends on a first temperature source 310 which provides a temperature input to the deep learning model 308. The temperature may model the environment of an oscillator providing the first clock signal. In some examples, the deep learning model 308 depends on multiple temperatures sources, such as the first temperature source 310 and a second temperature source 312. The use of multiple temperature sources may improve the accuracy of the deep learning model 308.

In operation 910, process 900 exits the holdover. When not in a holdover, a system may use the second clock signal with the first clock signal and temperature to refine the deep learning model 308. In an example, the deep learning model 308 is trained in open-loop training 604 using the first clock signal, the second clock signal, and temperature information regarding the source of the first clock signal. This training may improve the deep learning model 308.

Figure 10:
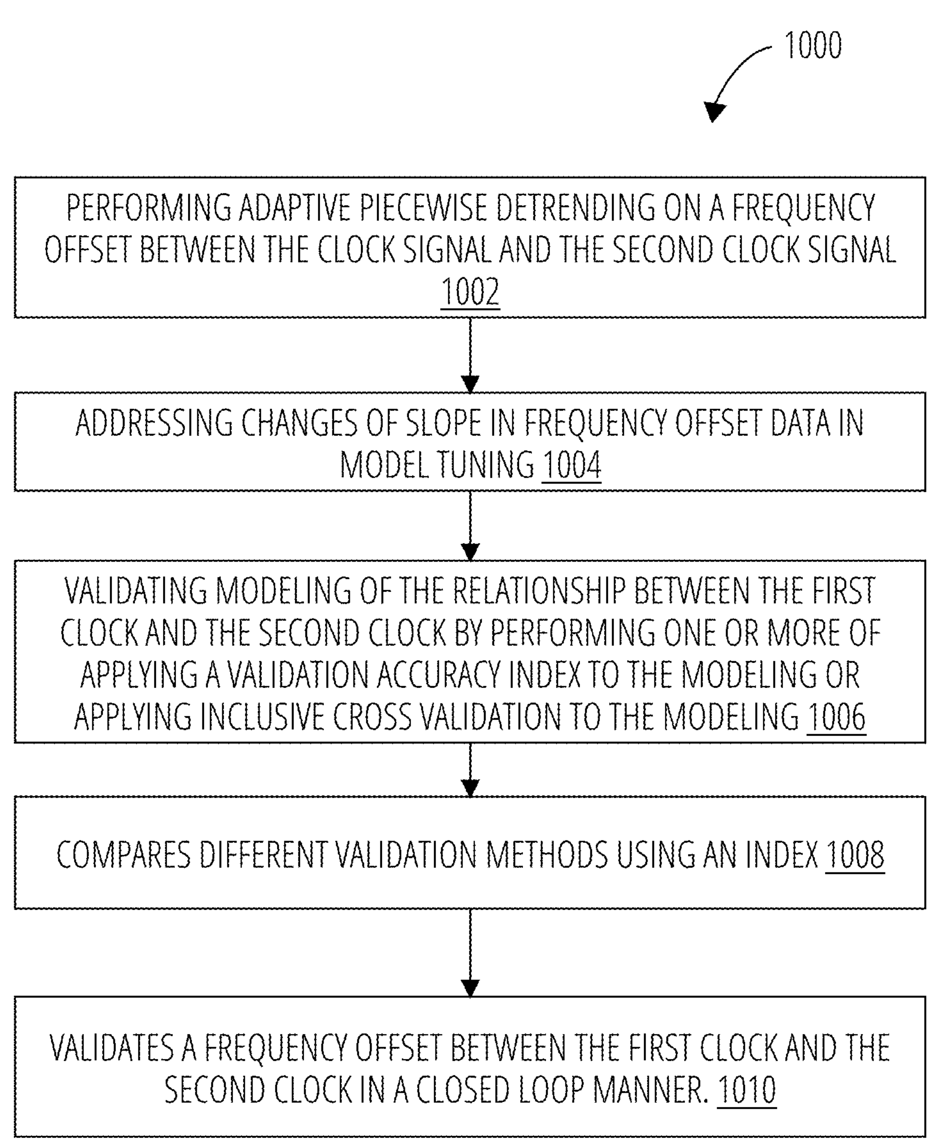
FIG. 10 is a flow diagram depicting a process in accordance with one or more examples.

FIG. 10 is a flow diagram depicting a process 1000 for predicting a frequency offset of a clock during holdover in accordance with one or more examples.

At operation 1002, process 1000 performs piecewise detrending 608 on a frequency offset between the clock signal and the second clock signal. This may include optional operation 1004, addressing changes of slope in frequency offset data in model tuning. The model tuning may set hyperparameters relevant to the piecewise detrending 608. For example, a number of time segments to divide the time series of data into may be a hyperparameter. In another example, a length of time for the time series of the second oscillating signal may be another hyperparameter. Longer lengths of time may allow better modeling but may use less relevant data. This tradeoff can be optimized as part of determining the hyperparameters for the deep learning models 308.

At operation 1006, process 1000 validates modeling of the relationship between the first clock signal and the second clock signal by performing one or more of applying validation accuracy index 620 to the modeling or applying inclusive cross validation 622 to the modeling.

In operation 1008, process 1000 compares different validation methods using an index. The comparison of different deep learning models 308 uses a standard scale with a specific index. In some examples, the standard scale is a confidence scale and the specific index is a percentage confidence. This allows the different deep learning models 308 to be compared and a deep learning model 308 with a highest confidence to be identified. The deep learning model 308 with the highest confidence may then be used to generate a result. The deep learning model 308 with the highest confidence is selected to be the deep learning model 308 used to make frequency offset predictions during a holdover.

In operation 1010, process 1000 validates a frequency offset between the first clock and the second clock in a closed loop manner.

Figure 11:
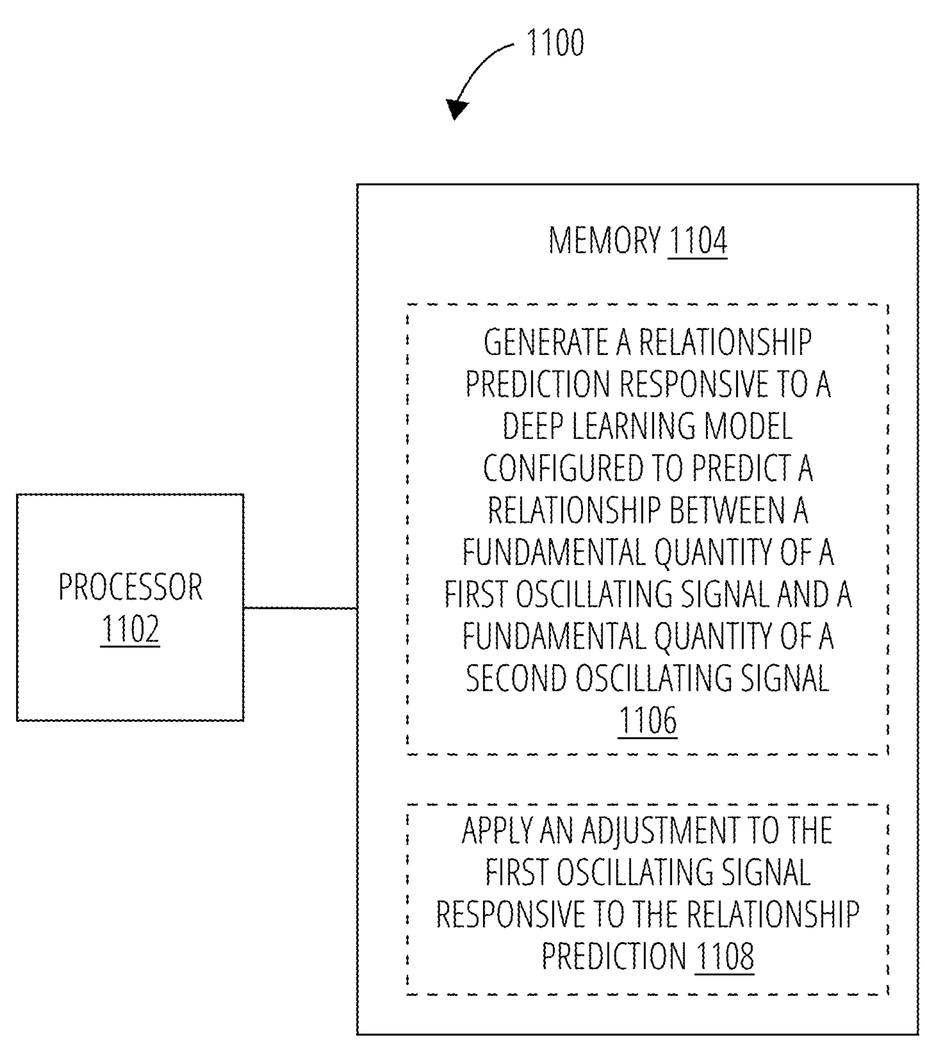
FIG. 11 is a block diagram of a system in accordance with one or more examples.

FIG. 11 is a block diagram of a system 1100 in accordance with one or more examples. The system 1100 includes a processor 1102 and an associated memory 1104. The processor 1102 is in communication with the memory 1104 so that instructions in the memory 1104 may be executed by the processor 1102. The memory 1104 includes instructions which, when executed by the processor 1102, cause the processor 1102 to perform various operations. For example, operation 1106 includes instructions to generate a relationship prediction responsive to a deep learning model 308 configured to predict a relationship between a fundamental quantity of a first oscillating signal and a fundamental quantity of a second oscillating signal. In some examples, the deep learning model 308 is trained with temperature and historical data. Operation 1108 includes instructions to apply an adjustment to the first oscillating signal responsive to the relationship prediction. This generates an adjusted clock signal which correlates with the second clock signal. The second clock signal may be unavailable due to holdover. Accordingly, the adjusted clock signal allows simulation of the second clock signal when the second clock signal is not available.

Figure 12:
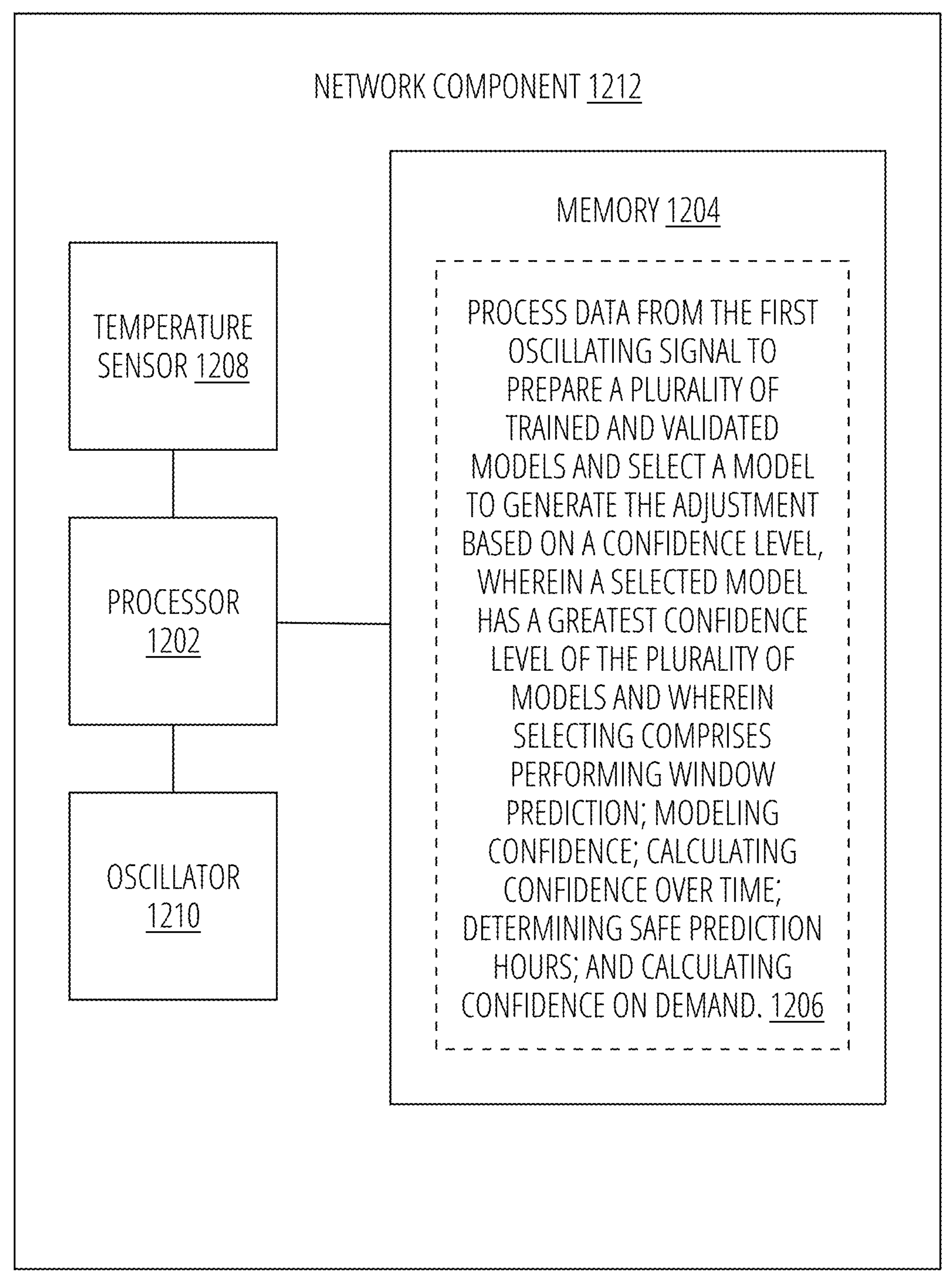
FIG. 12 shows a processor and an associated memory in accordance with one or more examples.

FIG. 12 shows a processor 1202 and an associated memory 1204 in accordance with one or more examples. The memory 1204 includes instructions which, when executed by the processor 1202 cause the processor 1202 to process data regarding a fundamental quantity of the first oscillating signal to prepare a plurality of trained and validated models and select a model to generate the adjustment based on a confidence level, wherein a selected model has a greatest confidence level of the plurality of models and wherein selecting comprises performing window prediction; modeling confidence; calculating confidence over time; determining safe prediction hours; and calculating confidence on demand. These activities are included in operation 1206.

The processor 1202 and memory 1204 may be part of a network component 1212. The processor 1202 has an associated oscillator 1210 which provides the first oscillating signal. The processor 1202 has an associated temperature sensor 1208 which provides temperature information regarding the associated oscillator 1210 to the processor 1202. The first oscillating signal and temperature information may be used as inputs to the plurality of deep learning models 308.

The plurality of trained and validated deep learning models 308 provide a plurality of models to simulate the second oscillating signal. The plurality of models allows for comparison of the plurality of models to determine which model has a greatest confidence level. This allows the system to use the model with the greatest confidence level to generate the adjustment. The adjustment thus can use the greatest confidence model with the confidence level being determined on demand, i.e., confidence on demand 636.

Selecting the model with the greatest confidence may include performing window prediction 628, modeling confidence, calculating confidence over time 632, determining safe prediction hours 634, and calculating confidence on demand 636. These activities allow for determination of the model with the greatest confidence level.

FIG. 13 is a flow diagram depicting a process 1300 according to one or more examples.

At operation 1302, process 1300 performs adaptive piecewise detrending on a frequency offset data of the first oscillating signal vs. the second oscillating signal to address changes of slope in the frequency offset data. The frequency offset is detrended to produce a slope trend over time for the slope data. The slope data is processed piecewise to provide for the ability to detect trends in the slope data. In some examples, the process 1300 is a function of aging and temperature.

At operation 1304, process 1300 performs differentiation on a frequency offset between the first oscillating signal and the second oscillating signal during a period of time defined between a first synchronization event and a second, subsequent synchronization event. The period of time between the first synchronization event and second, subsequent synchronization event defines a holdover period. During the holdover period, operation 1304 differentiates the frequency offset as part of modeling the frequency offset.

At operation 1306, process 1300 applies an adjustment to the first oscillating signal during a period of time defined between a first synchronizing event and a second synchronizing event (i.e., the holdover period), wherein the first oscillating signal is unavailable during the period of time defined between the first synchronizing event and the second synchronizing event.

FIGS. 14A-14D are four graphs that individually depict aspects of a non-limiting example of inference live panel test results, in accordance with one or more examples.

Figure 14A:
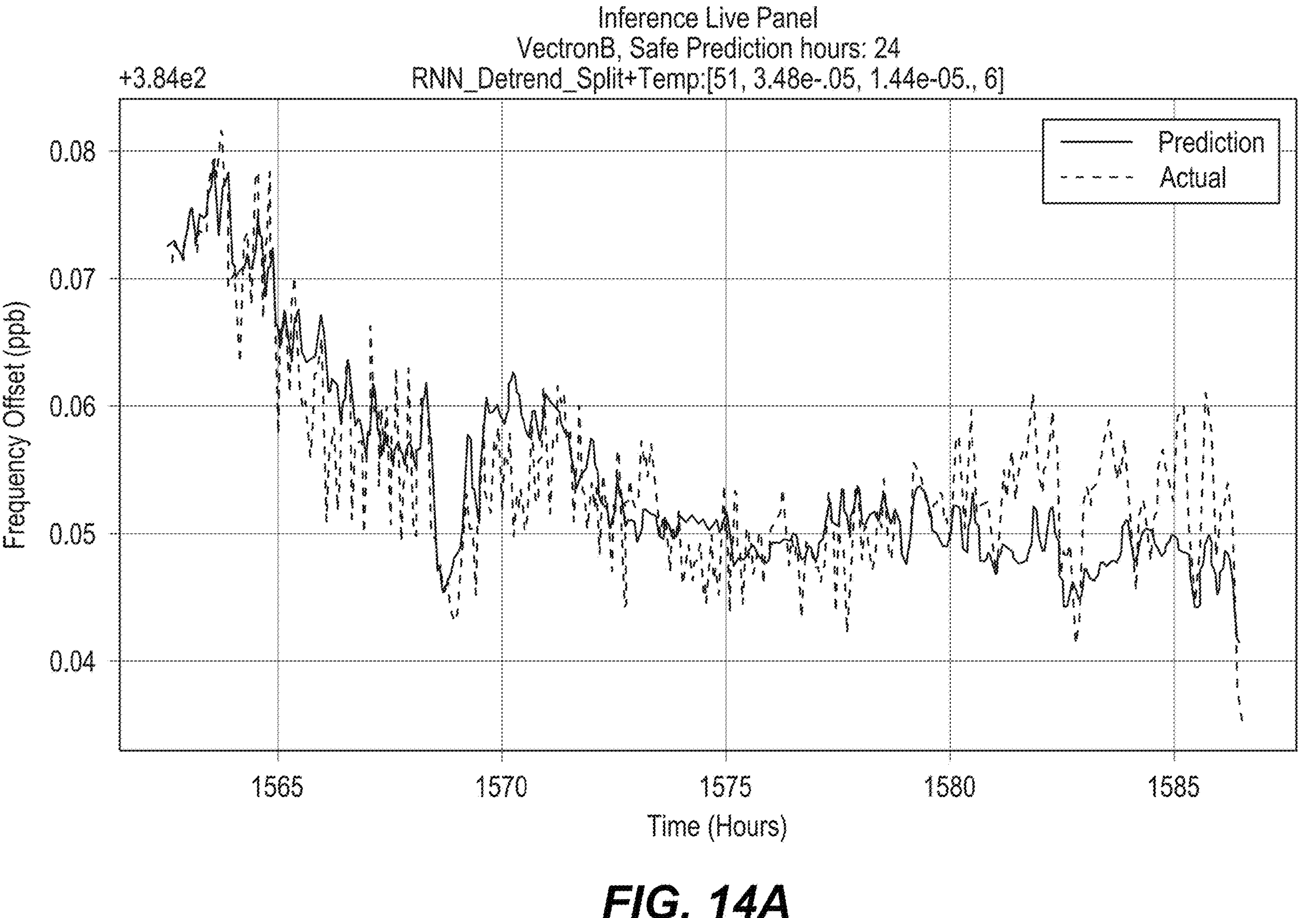
FIGS. 14A-14D are four graphs that individually depict aspects of a non-limiting example of inference live panel test results, in accordance with one or more examples.

FIG. 14A shows the predicted frequency offset vs. actual frequency offset, measured in parts per billion, over time. As can be seen, the predicted frequency offset, shown as a solid line, tracks with the actual frequency offset, shown as a dashed line, over time. It is also notable that the actual frequency offset changes over the time period such that using the last known value alone would result in a significant offset between the predicted value and the actual value.

Figure 14B:
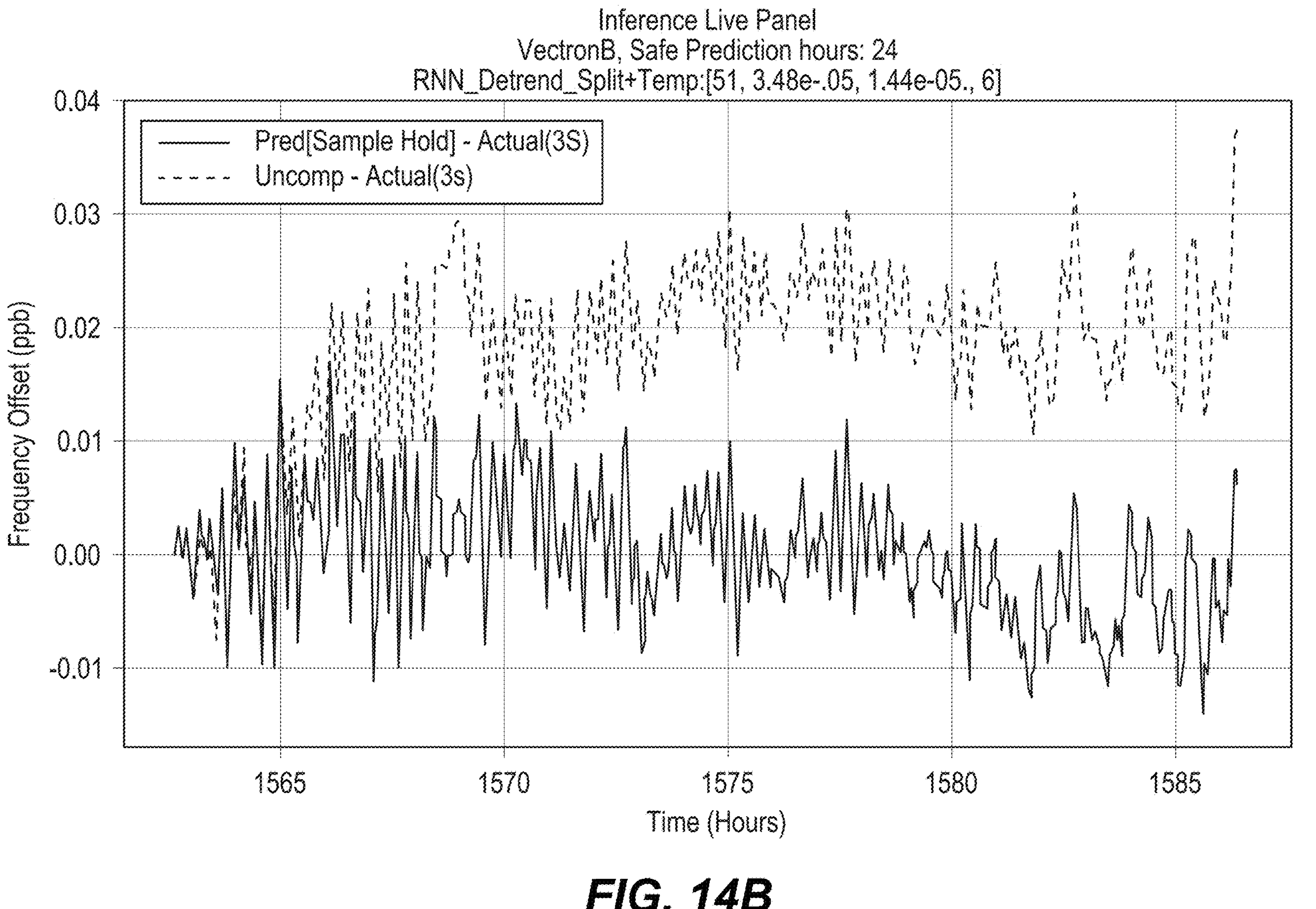

FIG. 14B shows predicted minus actual frequency offset (solid line) vs. uncompensated minus actual frequency offset (dashed line), measured in parts per billion. The predicted minus actual is centered on zero while the uncompensated minus actual shows significant deviation from zero. The predicted minus actual shows that the prediction value is close to the actual value as the difference is near zero. In contrast, the uncompensated minus actual differs significantly from zero, indicating that the uncompensated approach does a poor job of predicting the value over the shown time frame.

Figure 14C:
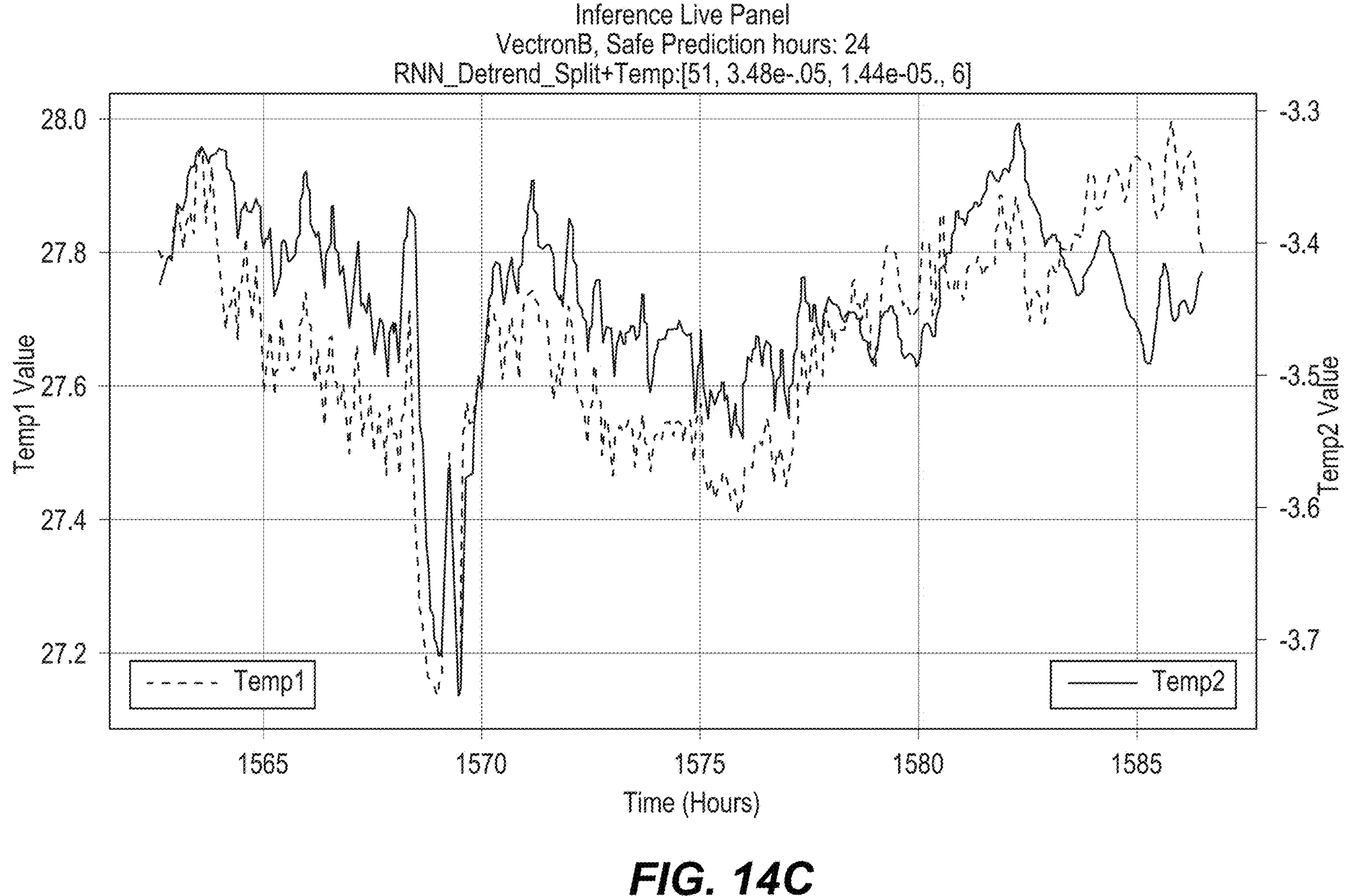

FIG. 14C compares the temperature relationship between a first temperature source 310 and a second temperature source 312. The first and second temperatures trend together indicating correlation between the two temperature sources. In this example, the first temperature source 310 and second temperature source 312 are different kinds of temperature sensors.

Figure 14D:
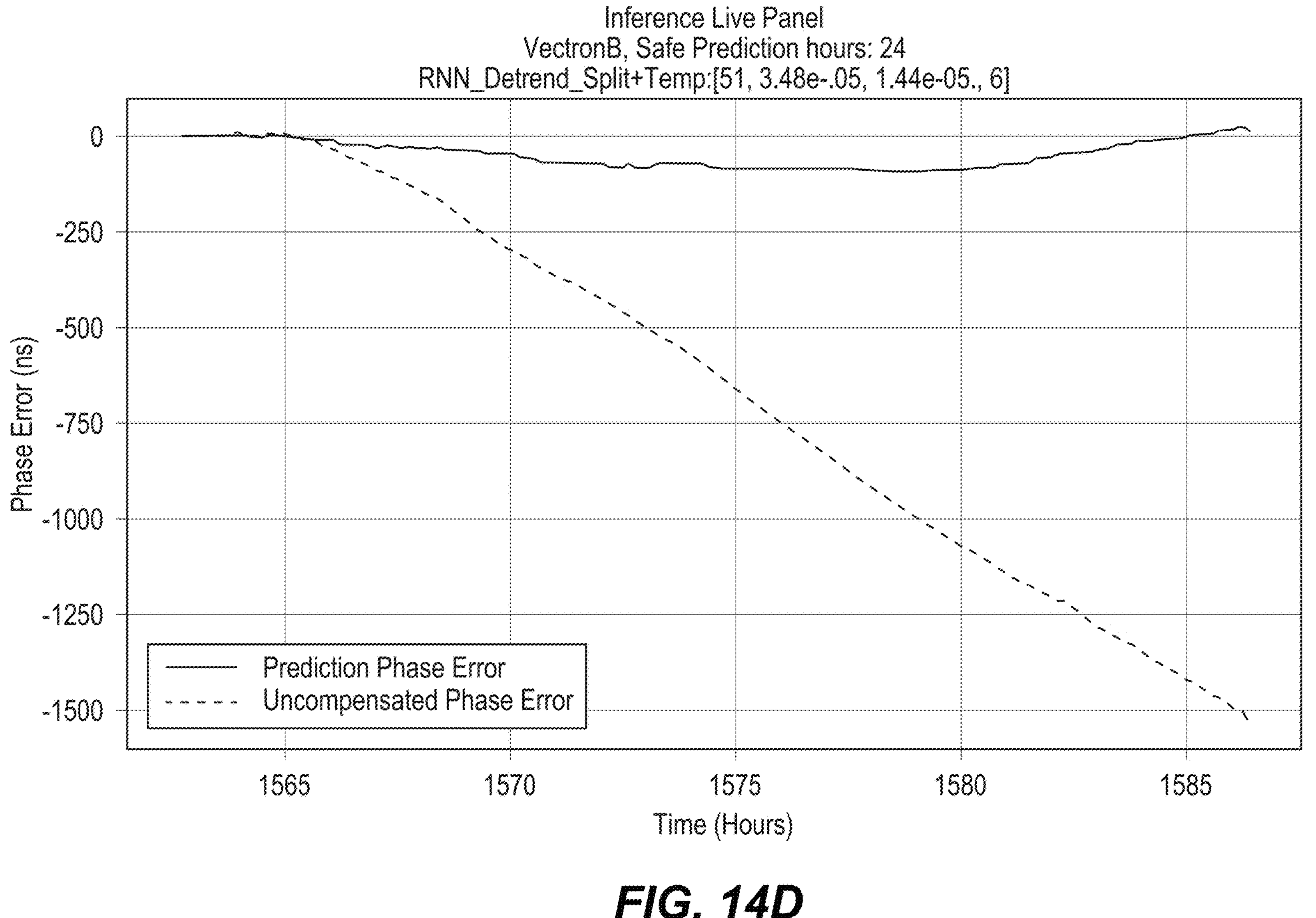

FIG. 14D shows a predicted phase error minus actual phase error between a first clock signal and a second clock signal over 24 hours, shown as a solid line, and an uncompensated phase error between the first clock signal and the second clock signal, both over a 24-hour holdover period, shown as a dashed line, both measured in phase error in nanoseconds. As can be seen, the uncompensated frequency offset drifts away from the zero value indicating poor prediction by the uncompensated system. In contrast, the predicted phase error less the actual phase error between the first clock signal and the second clock signal trends around zero, indicating effective prediction of the actual value. The disclosed model phase error is lower than 1 microsecond for a 24-hour holdover period.

Additional non-limiting examples of the disclosure include:

Example 1

A method of adjusting a first oscillating signal, comprising: generating a relationship prediction responsive to a deep learning model, the deep learning model configured to predict a relationship between a fundamental quantity of a first oscillating signal and a fundamental quantity of a second oscillating signal; and applying an adjustment to the first oscillating signal responsive to the relationship prediction to produce an adjusted oscillating signal, wherein the adjusted oscillating signal replaces the second oscillating signal.

Example 2

The method according to Example 1, comprising sensing a temperature associated with an oscillator providing the first oscillating signal, and providing one or more sources of the sensed temperature as input to the deep learning model, the deep learning model configured to predict the relationship between the fundamental quantity of the first oscillating signal and the fundamental quantity of the second oscillating signal responsive to the sensed temperature associated with the oscillator providing the first oscillating signal.

Example 3

The method according to any of Examples 1 and 2, wherein the applying an adjustment to the first oscillating signal comprises: applying the adjustment to the first oscillating signal during a period of time defined between a first synchronizing event and a second synchronizing event.

Example 4

The method according to any of Examples 1 through 3, wherein the second oscillating signal is unavailable during the period of time defined between the first synchronizing event and the second synchronizing event.

Example 5

The method according to any of Examples 1 through 4, comprising: providing a frequency offset between the first oscillating signal and the second oscillating signal as an input to the deep learning model.

Example 6

The method according to any of Examples 1 through 5, comprising: training the deep learning model using data comprising a measurement of the fundamental quantity of the first oscillating signal, a measurement of the fundamental quantity of the second oscillating signal, and a measurement of a temperature exhibited in an environment of a source of the first oscillating signal.

Example 7

The method according to any of Examples 1 through 6, comprising: modeling the relationship between the fundamental quantity of the first oscillating signal and the fundamental quantity of the second oscillating signal.

Example 8

The method according to any of Examples 1 through 7, wherein the modeling the relationship between the fundamental quantity of the first oscillating signal and the fundamental quantity of the second oscillating signal comprises: performing adaptive piecewise detrending on frequency offset data of the first oscillating signal and the second oscillating signal to address changes of slope in the frequency offset data.

Example 9

The method according to any of Examples 1 through 8, wherein the modeling the relationship between the fundamental quantity of the first oscillating signal and the fundamental quantity of the second oscillating signal comprises: performing differentiation on a frequency offset between the first oscillating signal and the second oscillating signal during a period of time defined between a first synchronization event and a second, subsequent synchronization event.

Example 10

The method according to any of Examples 1 through 9, comprising obtaining the deep learning model responsive to training one or more of a multilayer perception (MLP) deep learning model, a recurrent neural network (RNN) deep learning model, and a long short term memory (LSTM) deep learning model.

Example 11

An apparatus, comprising: a processor; and a memory having executable instructions thereon which, when executed by the processor, enable the processor to: generate a relationship prediction responsive to a deep learning model, the deep learning model configured to predict a relationship between a fundamental quantity of a first oscillating signal and a fundamental quantity of a second oscillating signal; and apply an adjustment to the first oscillating signal responsive to the relationship prediction to produce an adjusted oscillating signal, wherein the adjusted oscillating signal replaces the second oscillating signal.

Example 12

The apparatus according to Example 11, comprising one or more temperature sources to provide a temperature input to the deep learning model, the deep learning model configured to predict the relationship between the fundamental quantity of the first oscillating signal and the fundamental quantity of the second oscillating signal responsive to a sensed temperature associated with the oscillator providing the first oscillating signal.

Example 13

The apparatus according to any of Examples 11 and 12, wherein the first oscillating signal is provided by a local crystal oscillator and the second oscillating signal is provided by an off chip oscillator.

Example 14

The apparatus according to any of Examples 11 through 13, comprising a crystal oscillator to provide the first oscillating signal.

Example 15

The apparatus according to any of Examples 11 through 14, wherein the memory comprises instructions which, when executed by the processor, enable the processor to: process data regarding the first oscillating signal to prepare a plurality of trained and validated models and select a model from the prepared plurality of trained and validated models to generate the adjustment based on a confidence level, wherein the selected model has a greatest confidence level of the prepared plurality of trained and validated models.

Example 16

The apparatus according to any of Examples 11 through 15, wherein the memory comprises instructions which, when executed by the processor, enable the processor to: perform window prediction; model confidence; calculate confidence over time; determine safe prediction hours; and calculate confidence on demand.

Example 17

The apparatus according to any of Examples 11 through 16, wherein the apparatus is part of a network component.

Example 18

A method comprising: receiving a second clock signal; modeling a relationship between a first clock signal and the received second clock signal using a deep learning system; entering a holdover period with respect to the second clock signal; providing an adjusted clock signal responsive to the relationship and the first clock signal during the holdover period; and exiting the holdover period.

Example 19

The method according to Example 18, wherein the modeling a relationship between the first clock signal and the second clock signal using the deep learning system comprises performing adaptive piecewise detrending on a frequency offset between the adjusted clock signal and the second clock signal.

Example 20

The method according to any of Examples 18 and 19, wherein adaptive piece wise detrending comprises addressing changes of slope in frequency offset data in model tuning.

Example 21

The method according to any of Examples 18 through 20, comprising validating modeling of the relationship between the first clock signal and the second clock signal by performing one or more of applying a validation accuracy index to the modeling or applying inclusive cross validation to the modeling.

Example 22

The method according to any of Examples 18 through 21, wherein a validation accuracy index comprises an index to evaluate different validation methods.

Example 23

The method according to any of Examples 18 through 22, wherein inclusive cross validation comprises validating frequency offset between the first clock signal and the second clock signal in a closed loop manner.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features in another example while still being encompassed within the scope of the invention as contemplated by the inventor.

What is claimed is:

1. A method of adjusting a first oscillating signal, comprising:

sensing a temperature associated with an oscillator providing a first oscillating signal;

providing one or more sources of the sensed temperature as input to a deep learning model, the deep learning model selected from a plurality of trained and validated deep learning models, the deep learning model to predict a relationship between a fundamental quantity of a first oscillating signal and a fundamental quantity of a second oscillating signal responsive to sensed temperature associated with the oscillator providing the first oscillating signal, wherein the deep learning model comprising an artificial neural network having multiple layers, wherein the deep learning model at least partially based on one or more hyperparameters;

generating a relationship prediction responsive to the selected deep learning model provided the one or more sources of the sensed temperature as input; and applying, during a period of time defined between a first synchronizing event and a second synchronizing event, an adjustment to the first oscillating signal responsive to the relationship prediction to produce an adjusted oscillating signal, wherein the adjusted oscillating signal replaces the second oscillating signal.

2. A method of adjusting a first oscillating signal, comprising:

generating a relationship prediction responsive to a deep learning model selected from a plurality of trained and validated deep learning models, the selected deep learning model to predict a relationship between a fundamental quantity of a first oscillating signal and a fundamental quantity of a second oscillating signal, wherein the deep learning model comprising a an artificial neural network having multiple layers, wherein the deep learning model at least partially based on one or more hyperparameters; and applying, during a period of time defined between a first synchronizing event and a second synchronizing event, an adjustment to the first oscillating signal responsive to the relationship prediction to produce an adjusted oscillating signal, wherein the adjusted oscillating signal replaces the second oscillating signal.

3. The method of claim 2, wherein the second oscillating signal is unavailable during the period of time defined between the first synchronizing event and the second synchronizing event.

4. The method of claim 2, comprising:

providing a frequency offset between the first oscillating signal and the second oscillating signal as an input to the deep learning model.

5. The method of claim 1, comprising:

training the selected deep learning model using data comprising a measurement of the fundamental quantity of the first oscillating signal, a measurement of the fundamental quantity of the second oscillating signal, and a measurement of a temperature exhibited in an environment of a source of the first oscillating signal.

6. The method of claim 2, comprising:

modeling the relationship between the fundamental quantity of the first oscillating signal and the fundamental quantity of the second oscillating signal.

7. The method of claim 6, wherein modeling the relationship between the fundamental quantity of the first oscillating signal and the fundamental quantity of the second oscillating signal comprises:

performing adaptive piecewise detrending on frequency offset data of the first oscillating signal and the second oscillating signal to address changes of slope in the frequency offset data.

8. The method of claim 6, wherein modeling the relationship between the fundamental quantity of the first oscillating signal and the fundamental quantity of the second oscillating signal comprises:

performing differentiation on a frequency offset between the first oscillating signal and the second oscillating signal during a period of time defined between a first synchronization event and a second, subsequent synchronization event.

9. The method of claim 2, comprising obtaining the deep learning model responsive to training one or more of a multilayer perception (MLP) deep learning model, a recurrent neural network (RNN) deep learning model, and a long short term memory (LSTM) deep learning model.

10. The method of claim 2, comprising:

utilizing the adjusted first oscillating signal in place of the second oscillating signal for a totality of a holdover period.

11. The method of claim 2, wherein the fundamental quantity of the first oscillating signal comprises a frequency of the first oscillating signal, and the fundamental quantity of the second oscillating signal comprises a frequency of the second oscillating signal.

12. The method of claim 2, wherein the fundamental quantity of the first oscillating signal comprises a frequency offset of the first oscillating signal, and the fundamental quantity of the second oscillating signal comprises a frequency offset of the second oscillating signal.

13. An apparatus, comprising:

a processor;

a memory having executable instructions thereon which, when executed by the processor, enable the processor to:

generate a relationship prediction responsive to a deep learning model selected from a plurality of trained and validated deep learning models, the selected deep learning model to predict a relationship between a fundamental quantity of a first oscillating signal and a fundamental quantity of a second oscillating signal wherein the deep learning model at least partially based on one or more hyperparameters; and apply, during a period of time defined between a first synchronizing event and a second synchronizing event, an adjustment to the first oscillating signal responsive to the relationship prediction to produce an adjusted oscillating signal, wherein the adjusted oscillating signal replaces the second oscillating signal; and one or more temperature sources to provide a temperature input to the selected deep learning model, the selected deep learning model to predict the relationship between the fundamental quantity of the first oscillating signal and the fundamental quantity of the second oscillating signal responsive to a sensed temperature associated with the oscillator providing the first oscillating signal.

14. The apparatus of claim 13, wherein the first oscillating signal is provided by a local crystal oscillator and the second oscillating signal is provided by an off chip oscillator.

15. The apparatus of claim 13, comprising a crystal oscillator to provide the first oscillating signal.

16. The apparatus of claim 13, wherein the memory comprises instructions which, when executed by the processor, enable the processor to: process data regarding the first oscillating signal to prepare a plurality of trained and validated models and select a model from the prepared plurality of trained and validated models to generate the adjustment based on the confidence level, wherein the selected model has a greatest confidence level of the prepared plurality of trained and validated models.

17. The apparatus of claim 16, wherein the memory comprises instructions which, when executed by the processor, enable the processor to: perform window prediction; model confidence; calculate confidence over time; determine safe prediction hours; and calculate confidence on demand.

18. The apparatus of claim 13, wherein the apparatus is part of a network component.

19. The apparatus of claim 13, wherein the executable instructions on the memory include instructions which, when executed by the processor, enable the processor to:

utilize the adjusted oscillating signal in place of the second oscillating signal for a totality of a holdover period.

20. The apparatus of claim 13, wherein the fundamental quantity of the first oscillating signal comprises a frequency of the first oscillating signal, and the fundamental quantity of the second oscillating signal comprises a frequency of the second oscillating signal.

21. The apparatus of claim 13, wherein the fundamental quantity of the first oscillating signal comprises a frequency offset of the first oscillating signal, and the fundamental quantity of the second oscillating signal comprises a frequency offset of the second oscillating signal.

22. A method comprising:

receiving a second clock signal;

modeling a relationship between a first clock signal and the received second clock signal using a deep learning model selected from among a plurality of trained and validated deep learning models as having a greatest confidence level, wherein the deep learning model comprising an artificial neural network having multiple layers, wherein the deep learning model at least partially based on one or more hyperparameters;

entering a holdover period to predict an offset with respect to the received second clock signal;

providing an adjusted clock signal responsive to the modeled relationship and the first clock signal during the holdover period; and exiting the holdover period.

23. The method of claim 22, wherein modeling the relationship between the first clock signal and the received second clock signal using the selected deep learning model comprises performing adaptive piecewise detrending on a frequency offset between the adjusted clock signal and the received second clock signal.

24. The method of claim 23, wherein adaptive piecewise detrending comprises addressing changes of slope in frequency offset data in model tuning.

25. The method of claim 23, comprising validating modeling of the relationship between the first clock signal and the received second clock signal by performing one or more of applying a validation accuracy index to the modeling or applying inclusive cross validation to the modeling.

26. The method of claim 25, wherein a validation accuracy index comprises an index to evaluate different validation methods.

27. The method of claim 25, wherein inclusive cross validation comprises validating frequency offset between the first clock signal and the received second clock signal in a closed loop manner.

28. A method of adjusting a first oscillating signal, comprising:

generating a function that combines data from a temperature source and time data from an oscillator for input to a deep learning model comprising an artificial neural network having multiple layers;

training the deep learning model, based at least in part on values of the function and one or more hyperparameters, to predict a relationship between a fundamental property of a first oscillating signal provided by the oscillator and a fundamental property of a second oscillating signal, wherein a hyperparameter is tunable; and applying, during a period of time defined between a first synchronizing event and a second synchronizing event, an adjustment to the first oscillating signal responsive to the relationship prediction to produce an adjusted oscillating signal, wherein the adjusted oscillating signal replaces the second oscillating signal, wherein the fundamental property of the first oscillating signal comprises one or more of phase, wavelength, or amplitude, and wherein the fundamental property of the second oscillating signal comprises one or more of phase, wavelength, or amplitude.

29. An apparatus, comprising:

a processor; and a memory having executable instructions thereon which, when executed by the processor, enable the processor to:

generate a function that combines data from a temperature source and time data from an oscillator for input to a deep learning comprising an artificial neural network having multiple layers;

generate a relationship prediction responsive to a deep learning model selected from a plurality of trained and validated deep learning models, the selected deep learning model to predict a relationship between a fundamental property of a first oscillating signal and a fundamental property of a second oscillating signal, wherein the deep learning model at least partially based on one or more hyperparameters; and apply, during a period of time defined between a first synchronizing event and a second synchronizing event, an adjustment to the first oscillating signal responsive to the relationship prediction to produce an adjusted oscillating signal, wherein the adjusted oscillating signal replaces the second oscillating signal, wherein the fundamental property of the first oscillating signal comprises one or more of a phase, a wavelength, or an amplitude, and wherein the fundamental property of the second oscillating signal comprises one or more of a phase, a wavelength, or an amplitude.

* * * * *